United States Patent [19]

Higgins-Luthman et al.

[11] Patent Number: 5,751,846
[45] Date of Patent: May 12, 1998

[54] DOCUMENT IMAGE COMPRESSION SYSTEM AND METHOD

[75] Inventors: Michael John Higgins-Luthman, Livonia; Robert Charles Kidd, Ann Arbor; Robert Dennis Klein, Farmington; Robert Chihsung Yen, Novi; Charles Martin Zalinski, Canton, all of Mich.

[73] Assignee: Unisys Corporation, Blue Bell, Pa.

[21] Appl. No.: 207,284

[22] Filed: Mar. 7, 1994

Related U.S. Application Data

[62] Division of Ser. No. 796,703, Nov. 21, 1991, Pat. No. 5,339,368.

[51] Int. Cl.$^6$ .................................................. G06K 9/00
[52] U.S. Cl. .................................... 382/169; 382/172
[58] Field of Search ......................... 382/128, 168, 382/169, 172, 132, 170, 274, 112, 232, 237

[56] References Cited

U.S. PATENT DOCUMENTS

| | | | |
|---|---|---|---|
| 4,229,764 | 10/1980 | Danos | 382/132 |
| 4,791,678 | 12/1988 | Hiromichi et al. | 382/51 |
| 4,903,145 | 2/1990 | Funada | 358/462 |
| 4,920,426 | 4/1990 | Hatori et al. | 358/433 |
| 4,950,894 | 8/1990 | Hara et al. | 382/169 |
| 4,951,201 | 8/1990 | Takeo et al. | 382/6 |
| 4,959,869 | 9/1990 | Hongo | 382/172 |
| 5,042,077 | 8/1991 | Burke | 382/128 |
| 5,046,118 | 9/1991 | Ajewole et al. | 382/169 |
| 5,060,081 | 10/1991 | Shimura | 382/169 |
| 5,086,488 | 2/1992 | Kato et al. | 382/51 |
| 5,123,060 | 6/1992 | Cho et al. | 382/51 |
| 5,140,417 | 8/1992 | Tanaka et al. | 382/56 |
| 5,157,740 | 10/1992 | Klein et al. | 380/51 |
| 5,164,993 | 11/1992 | Capozzi et al. | 382/51 |
| 5,170,443 | 12/1992 | Todd | 382/274 |
| 5,177,797 | 1/1993 | Takenaka et al. | 382/56 |
| 5,388,168 | 2/1995 | Sakashita et al. | 382/274 |
| 5,410,617 | 4/1995 | Kidd et al. | 382/169 |

FOREIGN PATENT DOCUMENTS

| | | | |
|---|---|---|---|
| 0187911 | 7/1986 | European Pat. Off. | H04N 1/40 |
| 0380081 | 8/1990 | European Pat. Off. | H03M 7/30 |
| 4034535 | 5/1991 | Germany | H04N 1/41 |

Primary Examiner—Joseph Mancuso
Attorney, Agent, or Firm—Harness Dickey & Pierce; John B. Sowell; Mark T. Starr

[57] ABSTRACT

A discrete transform image data compression system in which frequency transform coefficients are modified in accordance with a matrix of quantizer values employs a predefined plurality of quantization matrices to adaptively select, on a document-by-document basis, an approximate memory packet size for each document's compressed image data storage by selecting one of the plurality of quantization matrices in accordance with the packet size estimate obtained for each document image. Additionally, the system employs generation of contrast reduction and gray level stretch remapping curves as a function of global image data characteristics, such as a gray level histogram of the document image data. The remapping curves are utilized to preprocess the image data for more effective data compression.

15 Claims, 5 Drawing Sheets

DOCUMENT IMAGE COMPRESSION SYSTEM AND METHOD

This is a division of U.S. patent application Ser. No. 796,703, filed Nov. 21, 1991 now U.S. Pat. No. 5,339,368.

BACKGROUND OF THE INVENTION

The invention concerns image data processing. More particularly, the invention relates to an improved method and arrangement utilizing a discrete frequency transform data compressor wherein the compression characteristics can be modified in real time on a per document basis.

Financial documents, such as checks or drafts, usually contain a magnetic ink character recognition (MICR) code line which is typically read by a sorter and which automatically sorts these documents into a plurality of bins. Prior to sorting, in current practice, these sorted documents are presented to banking personnel who physically handle the documents and mechanically enter, in MICR form, the dollar amount associated therewith upon each document by use of specialized amount entry equipment. Additionally, these individuals physically correct incorrectly read MICR data associated with each of the sorted documents.

These prior techniques of utilizing banking personnel to process financial documents have proven relatively costly and inefficient, in that many of these documents have been lost or destroyed during their physical handling, and the speed associated with the processing of the documents is limited to that associated with the processing capabilities of the banking personnel and the mechanical amount entry equipment they use.

To address these problems, document imaging systems have been introduced to eliminate much of the previously required physical handling of the documents themselves. In such known systems, functions such as image data element normalization, background suppression, scaling and document height detection are performed as preprocessing functions prior to compression of the document image data for storage or transmission to a data decompressor.

Previous approaches for effecting background suppression in document image processing systems to yield higher contrast images for data entry operators are complex. Additionally, for imaging systems to be associated with archival storage systems, the original image data cannot be discarded in a suppression technique, but must be maintained for archival integrity in order to store the document images in a near-photographic quality form.

One class of known compression techniques involves transforming gray level pixel values of the original document image data into a spatial frequency domain via a transform type compressor. The Joint: Photographic Experts Group of the International Standards Organization (ISO/JPEG) is currently developing an international standard compression technique and interchange format which may be used to compress continuous tone gray scale or color imagery. The compression standard under development by this group is commonly referred to as the ISO/JPEG (or JPEG) image compression algorithm, and it is based upon a transform process known as the Discrete Cosine Transform. The JPEG compression standard is outlined in JPEG Technical Specification, Revision No. 6, dated Jan. 14, 1991. This document draft is also known as JPEG-9-R6.

The Discrete Cosine Transform (DCT) image compression technique in its broadest aspects may be summarized as follows. Each document's image pixel data is partitioned into 8×8 sample blocks. Then, each 8×8 sample block is transformed mathematically using the DCT into a set of 64 values referred to as the DCT coefficients. Each of these 8×8 64 element coefficient arrays may be considered as a block of frequency coefficients in the DCT method. One of the block's coefficients is referred to as the DC coefficient, while the other 63 are referred to as the AC coefficients. Each DCT coefficient contains information concerning the spatial frequencies associated with that block of original image pixel samples. The DC coefficient is proportional to the average value of all the samples located in the block and represents the DC level (i.e. the zero spatial frequency) associated with that block of sample pixels. The AC coefficients indicate the degree to which certain spatial frequencies are present or absent in the sample 8×8 block being examined.

The DCT coefficients are next quantized using a predetermined and separate integer quantization factor for each coefficient in the block. The 64 integer quantization factors are stored in a 64 element array known as the quantization matrix. Quantization is performed by dividing each DCT coefficient by its corresponding quantization matrix element and rounding the result to the nearest integer value. Quantizing the DCT coefficients contributes significantly to the image compression process by discarding data that is considered not visually significant. The quantization matrix controls the tradeoff between image fidelity and image compressibility.

Finally, statistical characteristics of the quantized coefficients are used to encode the quantized coefficients present in the 8×8 sample block.

The instant invention is directed to a document image compression approach which (a) uses a JPEG image compression algorithm to compress full gray scale document imagery, (b) provides a method to optimize the JPEG standard for compressing images and (c) provides a method to monitor and modify document image compression in real-time on a per document basis.

SUMMARY OF THE INVENTION

Accordingly, in a discrete transform system for compressing document image data arranged as a plurality of pixels, each representing one of a plurality of gray levels, the transform including a plurality of transform coefficients, an improvement comprises estimating a packet size of memory space required to store or transmit the document image data for a given document after compression by the discrete transform technique, and selecting one of a plurality of matrices of transform coefficient modifiers or quantizers as a function of the packet size estimate. The selected quantization matrix of transform coefficient modifiers is then utilized for the document of interest in altering the plurality of transform coefficients. This selection of quantization matrices may be performed on a document by document basis to thereby affect the compression statistics for a given set of documents in a desired manner.

Additionally, each pixel may be examined for generation of a histogram of all pixels in the document image data. A histogram processor may then generate a contrast reduction pixel conversion function and a gray level stretch pixel conversion function in accordance with preselected characteristics of the histogram. The contrast reduction and gray level stretch conversion functions are combined and applied as a combined conversion function to the document image data prior to estimating the required packet size.

BRIEF DESCRIPTION OF THE DRAWINGS

The objects and features of the invention will become apparent from a reading of a detailed description of a preferred embodiment taken in conjunction with the drawings, in which:

FIG. 9 is a plot of a typical target packet size transfer function.

DETAILED DESCRIPTION

Figure 1:
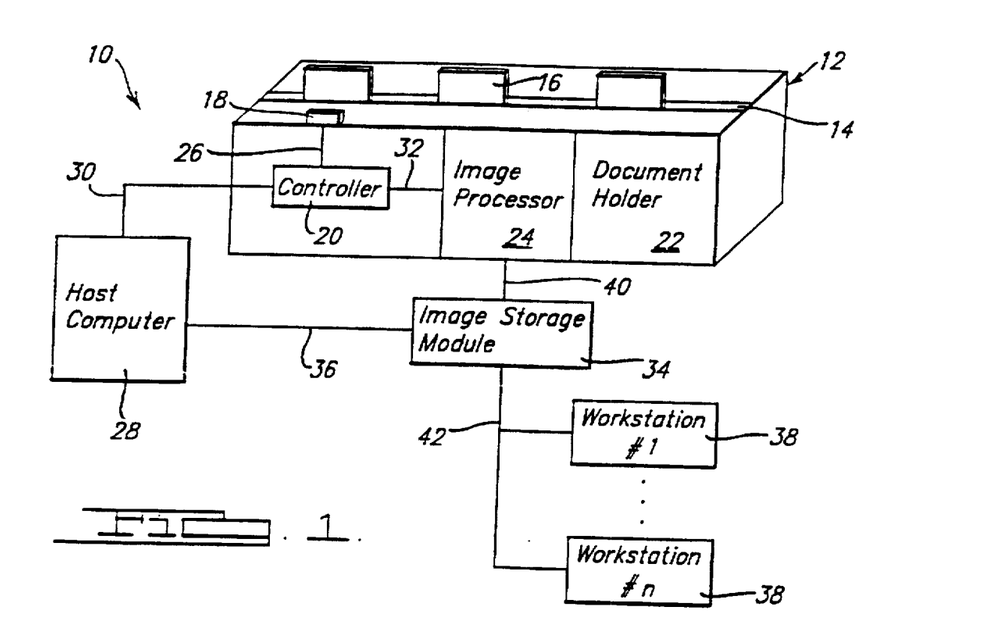
FIG. 1 represents a functional block diagram of a document processing system utilizing a preferred embodiment of the data compressor of the invention.

FIG. 1 sets forth a financial document processing system 10 having a document sorter 12 which, in the preferred embodiment of this invention, comprises a model DP 1800 sorter which is manufactured by the Unisys Corporation of Blue Bell, Pa.

Sorter 12 includes a track 14 through which a plurality of financial documents 16 traverse. Sorter 12 further contains a magnetic character reader 18 and magnetic strip character controller 20. Additionally, sorter 12 contains a document holder 22 and an image processor module 24.

Controller 20 is coupled to reader 18 by bus 26, to a host computer 28 by bus 30 and to image processor 24 by bus 32. Computer 28 is coupled to an image storage module 34 via bus 36 and image storage module 34 is also coupled to image processor 24 and to a plurality of work stations 38 via buses 40 and 42, respectively. It is contemplated that image storage module 34 could include a document image archival system.

In operation, documents 16 sequentially pass by reader 18 which reads a code appearing upon a MICR code line strip placed upon each of the documents 16. This code is then sent to computer 28 by signals on bus 30 for storage therein and to image processor 24 by signals on bus 32. As each of the documents 16 further travel along track 14, they pass in close proximity to processor 24 which creates an image thereof and sends this processed electronic image via signals on bus 40 to image storage module 34 for storage therein. After passing by processor 24, each of the documents 16 are then sorted by sorter 12 in a conventional manner based upon the contents of the MICR code line. The documents are then held within document holder 22.

After a typical block of documents 16 has been sorted in the aforementioned manner, workstations 38, by signals on bus 42, may sequentially request the aforementioned document images from storage module 34. These electronic images are then downloaded to the workstations 38 via bus 42 along with their associated magnetic code data obtained from host computer 28.

After the electronic images are decompressed, processed and displayed by workstation 38, workstation operators electronically enter information associated with each document (such as the so-called "courtesy amount" contained in a space on a typical bank check) and electronically resolve any difficulties associated with the reading of the MICR code. Each document image's information and associated corrections then form a single record which is sent to storage module 34 via bus 42. This information may then be later accessed for use in automatically placing MICR information on the sorted documents. Therefore, the document processing system 10 substantially eliminates the physical handling of the plurality of documents 16 when the associated MICR information is placed thereon, thereby increasing efficiency and speed of the overall document processing system 10.

Figure 2:
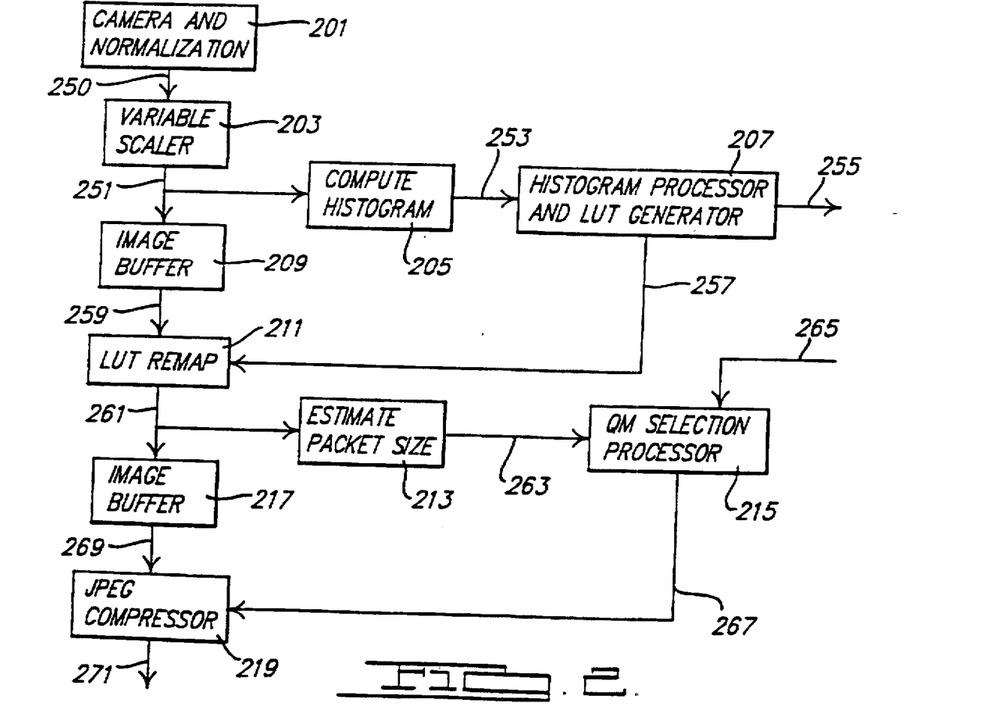
FIG. 2 sets forth a functional block diagram showing pertinent portions of the image processor 24 of FIG. 1 arranged in accordance with the principles of the invention.

FIG. 2 sets forth further details of image processor 24 of FIG. 1 arranged in accordance with the principles of the invention. As seen from FIG. 2, image processor 24 includes a camera and normalization unit 201 which is coupled via bus 250 to a variable scaler unit 203. Scaler 203 is coupled via bus 251 to a histogram generator 205 and an image buffer 209. An output of histogram generator 205 is coupled via bus 253 to a histogram processor and lookup table (LUT) generator 207. Generator 207, in the preferred embodiment, is comprised of one or more digital signal processors, which are specialized microprocessor units specially tailored to scientific and engineering types of calculations. Such digital signal processors are commercially available units.

One output of histogram processor 207 is designated 255 in FIG. 2 and carries one or more specialized lookup tables which may be subsequently used at workstations 38 of FIG. 1 to post-process decompressed image data.

A second output 257 of histogram processor 207 is coupled to a remapper unit 211 which is implemented in lookup table form. The scaled image data being held in buffer 209 is additionally coupled to remapper unit 211 via bus 259.

Remapped image data is coupled via bus 261 to a packet size estimator unit 213 and to another image buffer 217.

An output of the packet size estimator 213 is coupled via bus 263 to a quantization matrix (QM) selection processor unit 215. QM processor unit 215 is likewise implemented in the preferred embodiment by digital signal processor units. A second input to quantization matrix processor 215 is designated 265 and carries additional document data for use therein.

The selected quantization matrix, along with a suitable coding table such as a Huffman coder, is coupled via bus 267 to a JPEG compressor unit 219. The remapped image data from buffer 217 is then passed via bus 269 to compressor 219 for compression therein. The compressed data is then available at output 271 of compressor 219.

In general operation, the arrangement of FIG. 2 may be summarized as follows. Two camera assemblies are utilized in unit 201 to electronically capture both front and back sides of a document. Each of the camera assemblies in a preferred embodiment are comprised of a charge coupled photodiode array along with suitable illuminating lamps and lenses. Image data generated by the camera system undergoes normalization preprocessing in unit 201 to eliminate known camera system defects and anomalies which have been measured beforehand while calibrating the camera system assemblies.

Image normalization preprocessing is applied to all document imagery using the following process. Pixel gain and bias table data collected during camera calibration are downloaded from host computer 28 (FIG. 1) to memory in the image processor 24. Image normalization applies the downloaded gain and bias tables to the camera pixel data and normalized pixel data is output at bus 250.

Next, the normalized image data undergoes image scaling at scaler unit 203 to reduce the spatial resolution of the document image pixel representation. Image downscaling may be accomplished by using either a bi-linear interpolation or a pixel sub-sampling technique, both known in the art. Image scaling is applied to all document imagery using the following process. The down-scaling technique (bi-linear or sub-sampling) and the scaling factor are selected for each side of the document during system initialization. The image scaler supports a predefined number of non-integer scaling ratios that down-scale the input image to create an output image with a lower spatial resolution than that input with the input image data. The output image resolution depends upon the legibility and compression requirements associated with a specific document imaging application. A down-scaled (resolution reduced) image with the gray level range increased is output via bus 251.

Image histograms and lookup tables are generated at unit 205 and 207 via the following processing. Scaled image data is sent from scaler 203 in parallel via bus 251 to both an image histogram generator 205 and an image buffer 209. The image histogram generator 205 counts and records the number of pixels occurring at each gray level in the scaled document image and places that count in an appropriate "bin". The image buffer 209 temporarily stores the entire scaled document image while the image histogram is being generated and utilized for generating appropriate remapping lookup tables.

The gray level histogram is coupled via bus 253 to histogram processor and LUT generator 207 to create a gray level LUT used to perform an image preprocessing operation on the gray level pixel data via LUT remapper unit 211.

The gray level LUT applies a contrast reduction and a gray level stretch (both to be described in a later section of the specification) to the pixels of the scaled image stored in the temporary image buffer 209. Previously stored preprocessing parameters in processor 207 control the amount of contrast reduction and gray level stretching that is applied to the scaled imagery via remapping LUT 211. By properly selecting such processing parameters, adverse effects of the contrast reduction and gray level stretching upon the scaled imagery can be minimized.

Additional data extracted from the gray level histogram is used to create one or more gray level LUTs which are output at bus 255 for storage in an image file header. These LUTs can be applied optionally at an image workstation or image printer to post-process quickly the decompressed gray level image into a limited gray level or background suppressed rendition of the document. Since this processing operation is used only to generate a number of optional post-processing LUTs, it has no preprocessing effect on the scaled image data.

In a technique to be described in more detail below, the remapped data is then passed to an estimator unit 213 which is utilized in conjunction with other statistical data available from the document set being processed to enable quantization matrix selection processor 215 to select one of plurality of available quantization matrices along with a corresponding Huffman encoding table. The selected quantization matrix and coding table are passed via bus 267 to JPEG compressor unit 219, which then operates upon the remapped image data which has been temporarily stored in buffer 217 and passed to the compressor 219 via bus 269. In a preferred embodiment the ISO/JPEG baseline compression method is utilized to compress the preprocessed continuous tone full gray scale document imagery. Compressor 219 provides continuous tone near photographic image representations of the preprocessed document image data at an average compressed packet size amenable to the storage system being utilized for both the front and back sides of the document.

The scaled gray level histogram data are analyzed at processor 207 (FIG. 2) to generate a gray level remapping function via a lookup table which can be used to perform a selective global contrast reduction on pixel data present in the image. The goal of contrast reduction preprocessing is to improve the legibility of low contrast printing in the decompressed image when using the JPEG image compression technique by slightly lowering the contrast levels of high contrast printing and writing found in most document images. This preprocessing step is based on the assumption that small changes in high contrast printing are less detectable to human vision than small changes in low contrast printing.

Figure 3:
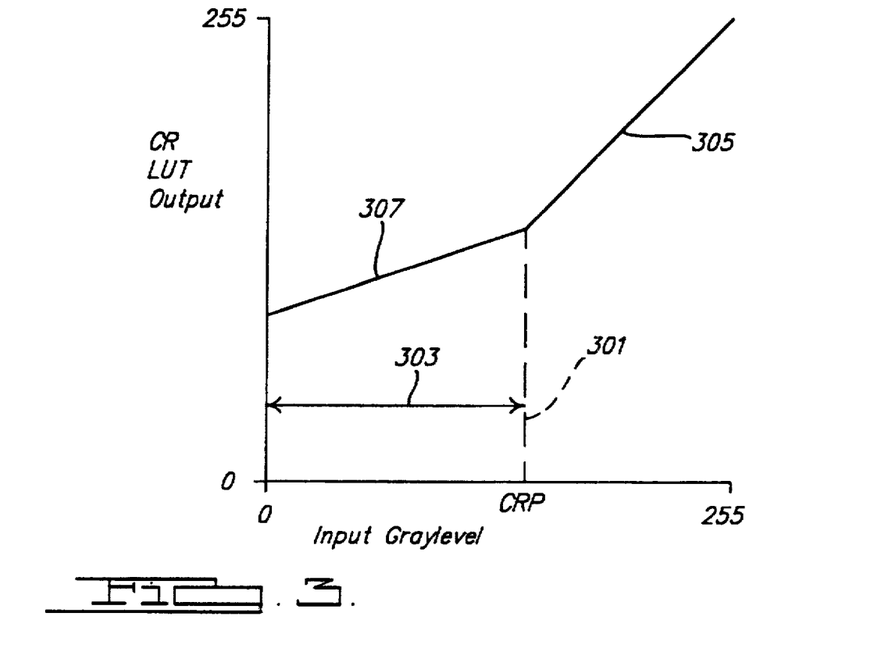
FIG. 3 depicts a graph of a contrast reduction remapping curve configured in accordance with the principles of the invention.

A typical remapping curve for the contrast reduction function is set forth in FIG. 3. As seen from FIG. 3, for gray levels above a contrast reduction protection point designated CRP 301, the output gray level is equal to the input gray level via the portion of the remapping function designated 305, because the slope of portion 305 of the remapping curve is unity. Below the protection point 301 the remapping curve comprises another linear segment 307 having a slope less than unity and intercepting the output axis. Hence, the contrast reduction range 303 extends from an input gray level of zero up to CRP 301. The slope of portion 307 of the remapping function is empirically determined from an investigation of a test set of documents having characteristics similar to those documents to be compressed in the actual image processing and compression system.

Figure 5:
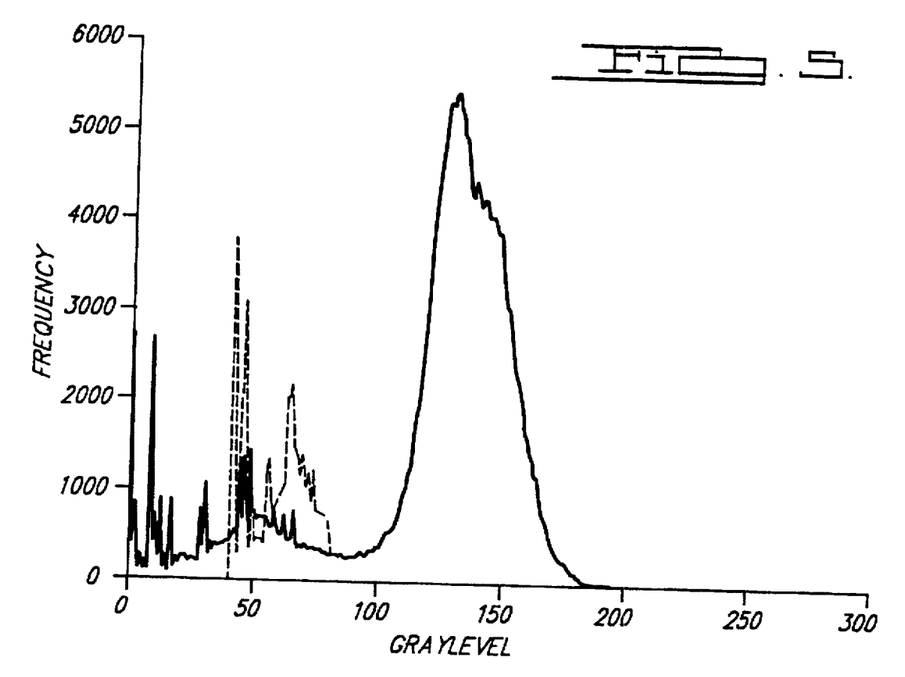
FIG. 5 sets forth an example of an original histogram and the same histogram after it has been applied to a contrast reduction remapping curve.

FIG. 5 sets forth a graph of an original histogram shown in solid form and a contrast reduced histogram shown in a dashed line after the remapping curve of FIG. 3 has been applied to a typical set of image data.

In addition to contrast reduction, the histogram processor 207 of FIG. 2 generates another remapping function designated as a "gray level stretching" function. The gray level stretching remapping function increases or "stretches" the gray level dynamic range of the pixel data present in the input image data.

Figure 4:
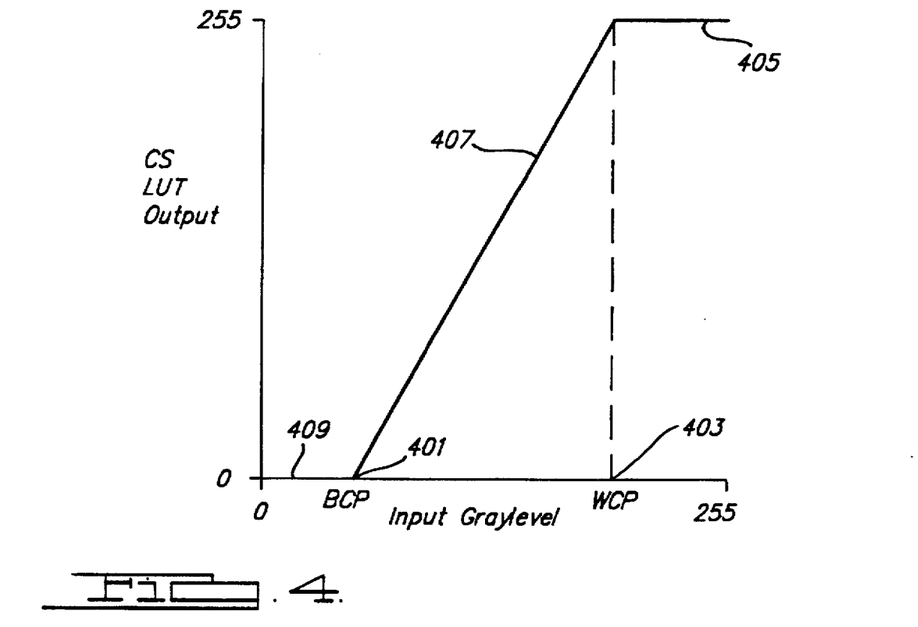
FIG. 4 depicts a graph of a gray level stretch remapping curve configured in accordance with the principles of the invention.
Figure 6:
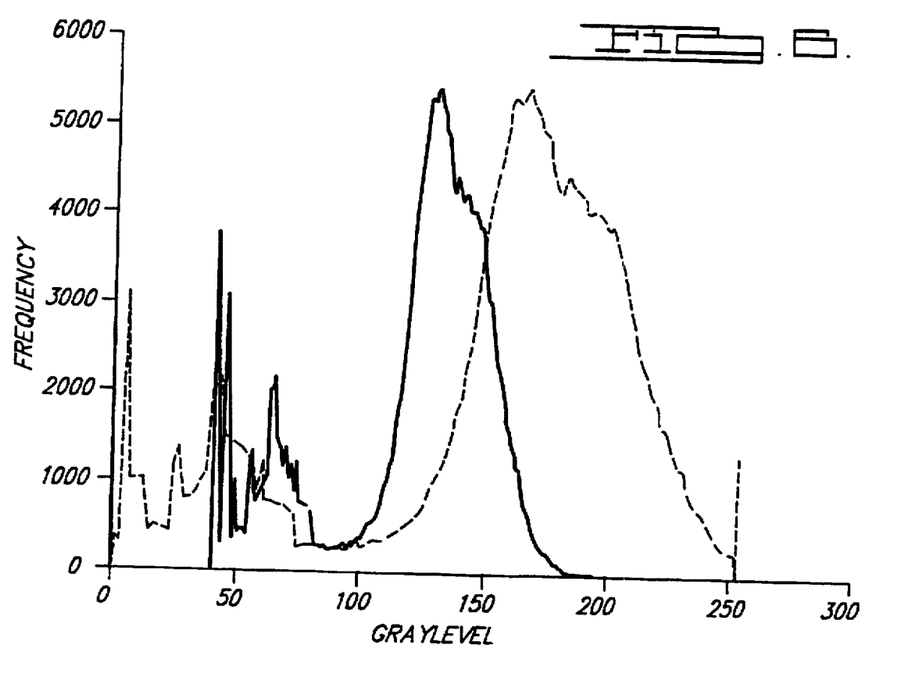
FIG. 6 sets forth an example of an original histogram and the same histogram after it has been applied to a gray level stretch remapping curve.

FIG. 4 sets forth a typical remapping piecewise linear gray level stretching function implemented by histogram processor 207. As seen from FIG. 4, all input gray levels greater than a white clipping point WCP 403 are remapped to the maximum gray level at section 405 of the remapping curve. For input gray levels between a white clipping point 403 and a black clipping point 401, the output gray level is stretched in accordance with a linear function 407 having a slope greater than unity. For input gray levels less than the black clipping point 401, the remapping function section 409 in FIG. 4 shows that the output gray level is set to the blackest or in this case, zero level. A typical original histogram as modified by the remapping curve such as that set forth in FIG. 4 is shown in the graph of FIG. 6 where the original histogram is shown in solid form and the dashed histogram is shown as that which has been remapped by the function such as that shown in FIG. 4.

The preprocessing combination of contrast reduction followed by gray level stretch performed by the LUT generated by histogram processor 207 improves low contrast performance of JPEG compressed document images. The precise amount of improvement depends upon the degree of contrast reduction, but is typically in the range of fifteen to twenty percent. In other words, images which are preprocessed with contrast reduction and gray level stretch and then JPEG compressed to average packet size K exhibit low contrast performance comparable to unpreprocessed images JPEG compressed to an average packet size of 1.15 K to 1.2 K. The combination of contrast reduction and gray level stretch amplifies low contrast data in bright regions of the image (typically document background) and attenuates signal amplitude in predominately dark image regions. In document images, useful information is rarely contained in small excursions between dark gray levels, but is frequently found in light information on a lighter background. Hence, the contrast reduction and gray level stretch combination tradeoff is a reasonable one.

Contrast reduction is designed to improve JPEG compression performance. If performed alone, however, contrast reduction requires a post-processing operation to restore full dynamic range. Gray level stretch has several benefits, including the reduction in the variation in overall image brightness and the partial compensation of camera variations. Additionally, gray level stretch improves JPEG performance on extremely dark documents. Therefore, the combination of contrast reduction and gray level stretch retains the benefits of the individual operations and eliminates the need for post-processing to restore dynamic range.

Returning to FIG. 3, the contrast reduction LUT-implemented conversion function is piecewise linear in two regions, 305 and 307. Above a contrast reduction protection threshold CRP 301, the LUT has no effect on the input gray levels. It is a line 305 passing through the origin and having a slope of 1. Below CRP 301, the contrast reduction lookup table is also linear, but it is a segment 307 having slope 1/C. C is called the compression factor. The larger the value of C, the more dark signals are attenuated. C is empirically determined from test documents typical of those to be imaged and compressed. In one system, a value of C=2 has been empirically determined to yield good results. As C increases (and therefore as the slope of segment 307 decreases) the standard packet size for a document image is reduced at the cost of higher visual distortion caused by digital noise.

The contrast reduction lookup table remapping function is defined as follows:

$$CR[i] = ROUND \left( \frac{i}{C} + \frac{CRP(C-1)}{C} \right) \quad \text{1a)}$$

for i=0,1, . . . CRP−1

$$CR[i] = i \quad \text{1b)}$$

for i=CRP,CRP+1, . . . , Max Input Gray

The ROUND function is a rounding off function which rounds the argument to the nearest integer.

The protection point CRP is derived from characteristics of the gray level histogram generated by the processor 207 of FIG. 2. More specifically, processor 207 determines a peak in the histogram greater than and closest to ¼ the maximum gray level input value and sets a protection point. CRP as a preselected percentage of that threshold. In one system, it has been empirically determined that a protection point CRP set as 80% of the threshold derived from the histogram will provide good results.

With further reference to FIG. 4, the gray level stretch LUT-implemented remapping function is designed to spread the gray levels occurring in the input image over the entire available output gray level range. In general, such a remapping function has a black clip point BCP 401 (input gray level below which all input gray levels are mapped to black) and a white clip point WCP 403 (input gray levels above which all input gray levels are mapped to white) separated by a line 407 with slope greater than 1. Clip points 401 and 403 are determined from the gray level histogram of the input image and the intervening line 407 is derived from these clip points.

In a preferred embodiment, points BCP and WCP are determined by starting at one gray level extreme of a histogram (e.g. 0 and 255) and moving toward the opposite extreme. A running sum of histogram frequencies is maintained, and when the sum exceeds an empirically derived threshold (which may differ for black and white thresholds), the next gray level to be summed is declared as the clip point. The lowest (i.e. blackest) value which is present in the input image histogram is not included in the running sum so as to neglect the dark overscan region of the image.

Given the clip points BCP and WCP, the gray level stretch remapping function for various gray levels i, GS[i] is given by:

$$GS[i]=1 \quad \text{2a)}$$

for i=0,1, . . . .BCP $$GS[i] = ROUND \left( \frac{MAX\ OUTPUT\ GRAY\ (i - BCP)}{WCP - BCP} \right) \quad \text{2b)}$$

for i=BCP+1, BCP+2, . . . , WCP−1

$$GS[i]=MAX\ OUTPUT\ GRAY$$

for i=WCP, WCP+1, . . . , Max Input Gray

Since both the contrast reduction and the gray level stretch remapping curves are simple piece-wise linear functions, they can easily be combined and performed by a single lookup table implemented function. Both the contrast reduction protection threshold and the gray level stretch clip points are computed from the original gray level histogram. The gray level stretch black clip point must then be contrast reduced—i.e. it must be mapped through the contrast reduction remapping function to approximate the effect of the contrast reduction function on the gray level histogram. Given this procedure, the combined remapping function, CRGS for various input gray levels i is specified by:

$$CRGS[i]=0 \quad \text{3a)}$$

for i=0,1, . . . BCP $$CRGS[i] = ROUND \left[ \frac{Max\ Output\ Gray \left[ ROUND \left[ \frac{i + CRP(C-1)}{C} - BCP^{CR} \right] \right]}{WCP - BCP^{CR}} \right] \quad \text{3b)}$$

for i=BCP+1, . . . . , CRP−1

$$CRGS[i] = \text{ROUND}\left[\frac{\text{Max Output Gray}[i - BCP^{CR}]}{WCP - BCP^{CR}}\right] \quad 3c)$$

for i=CRP, . . . , WCP−1

CRGS[i]=Max Output Gray for i=WCP, . . . , Max Input Gray

Note that equations 3b) and 3c) amount to application of the corrected gray level stretch remapping function to the contrast reduction remapping function. Thus, equations 3b) and 3c) could be written as:

$$CRGS[i] = \text{ROUND}\left[\frac{\text{Max Output Gray}[CR[i] - BCP^{CR}]}{WCP - BCP^{CR}}\right] \quad 4)$$

for i=BCP+1, . . . , WCP−1
where $$BCP^{CR} = \text{ROUND}\left[\frac{BCP}{C} + \frac{CRP(C-1)}{C}\right]$$

Code for implementing equations 1a) and 1b), 2a), 2b), 2c) and 3a), 3b), 3c), 3d), and equation 4) are set forth in the appendices hereto. This code is in the C language. In the main program loop set forth in Appendix 1, the histogram data is gathered, a contrast reduction protection point is obtained, the black and white clip points for the gray level stretch function are obtained, and a combined lookup table is formulated.

Appendix 2 sets forth the code for deriving the black and white clip points for the gray level stretch function. It is to be noted that the black and white thresholds towards which a cumulative sum mentioned above is calculated in deriving the clip points is set empirically to a value of 1.000. These values were determined empirically for one system showing satisfactory results and are related to the spatial resolution of the document images involved.

Appendix 3 sets forth the code for generating the contents of a combined contrast reduction and gray level stretch lookup table.

The quantization matrix used by the JPEG baseline compression technique is the primary determinant of image quality and compressibility. That is, the quantization matrix controls a tradeoff between image distortion and image compressibility. Fundamentally, using a quantization matrix which compresses the image to a larger packet size generates decompressed imagery with increased picture quality. Conversely, a quantization matrix which compresses the image to a smaller packet size generates decompressed imagery with decreased picture quality. The JPEG standard does not require a specific quantization matrix for image compression. JPEG assumes that each imaging application defines its own quantization matrix which will meet the image quality requirements associated with that application.

In accordance with the invention, a plurality of quantization matrices are generated to allow the JPEG compressor 219 of FIG. 2, on average, to compress the document imagery to any prespecified packet size. These quantization matrices are generated by extracting information from a large ensemble of "typical" document images. Quantization matrix generation is then performed and the results are downloaded into the compression hardware 219 of FIG. 2.

The quantization matrix generation technique permits the JPEG base line compression algorithm to be optimized to compress the front and back document imagery to any desired average packet size on a document-by-document basis.

While the quantization matrix generation techniques enables generation of quantization matrices which, on average, yield a targeted compressed packet size, it is still possible for individual images to deviate greatly from the targeted average. From an imaging system perspective, it may be desirable to do the following:

a) Provide an upper and lower bound to the compressed packet size associated with a specific type of document class;

upper packet size bounds may be necessary to ensure that image processor performance is not impacted seriously by the transmission and storage of compressed image files. Lower packet size bounds may be desirable to ensure some minimum image quality and legibility performance level;

b) provide a mechanism of quantization matrix selection by the selection processor 215 of FIG. 2 to control and/or shape the compressed packet size statistics for a collection of document images; and c) shape the statistical distribution associated with the compressed image packet size to minimize internal image buffer sizes and/or trade-off image quality between "classes" of imagery in the ensemble of documents.

Hence, packet size estimator 213 and quantization matrix selection processor 215 perform the quantization matrix selection process as follows. First, estimator 213 estimates the compressed image packet size for each document image that is about to be compressed with the JPEG base line technique. This estimate is performed in a number of optional ways. For example, the estimate may be accomplished by computing the AC energy for the document image by taking the discrete cosine transform of the pixel values, discarding the DC component and summing the absolute value of the remaining (in the specific embodiment 63) transform coefficients. The summing continues for all 8×8 pixel samples. This sum of absolute value comprises the total AC energy associated with the document's image. The energy figure is a measure of the compressibility of the associated document image. The higher the figure, the harder it is to compress the image data to a preselected packet size.

Preferably, estimator 213 actually compresses the document image using a "reference" or most likely to be used one of the pregenerated matrices of quantization coefficients. In the preferred embodiment, the "reference" matrix is the one which compresses a test ensemble of document images to a user-specified average packet size.

Figure 7:
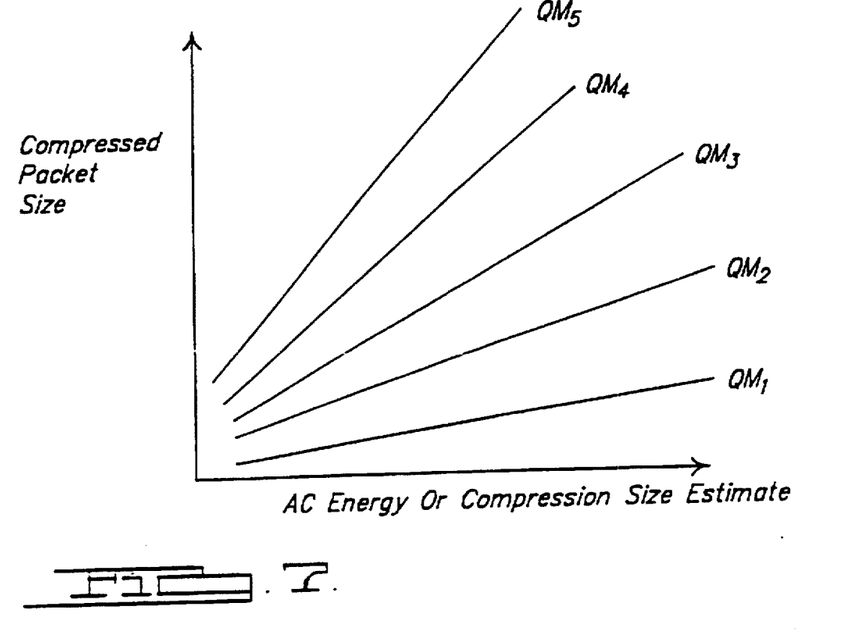
FIG. 7 shows an example of how compressed packet size can be selected using a packet size estimate in conjunction with a family of selectable quantization matrices.

Having provided the estimate at unit 213 of FIG. 2, the next step is to use a preselected decision function to select one of the plurality of prestored quantization matrices to achieve a desired result. For example, one such desired result would be to place the packet size required for a specific document as close as possible, without exceeding, a target value such that a uniform packet size is achieved regardless of which document is being processed. With reference to FIG. 7, it is seen that utilizing the packet size estimation figure, either by using AC energy calculation or an actual compression with a known quantization matrix along the X axis, a family of curves each representing a different quantization matrix which has previously been stored, can be plotted and the compressed packet size for a given document selected based on which quantization matrix is chosen.

Hence, selection processor 215 uses the estimated compressed packet size, along with other document information, such as dimensional information for the document or previous document packet size for this set of documents, to select from the prestored list the appropriate quantization matrix for the document of interest currently passing through image module processor 24 of FIG. 2.

Figure 8:
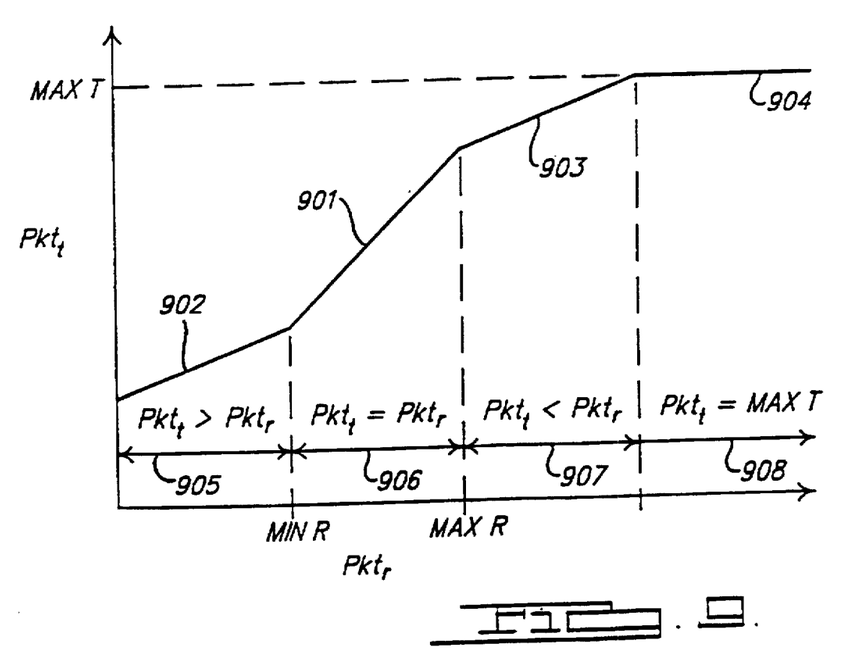
FIG. 8 is a flow chart setting forth the steps in selecting from $Qm_i$.

One method or decision function, which may be used by selection processor 215 to select a quantization matrix $QM_i$ may be explained with reference to FIGS. 8 and 9. Selection processor 215 first compresses an image using a standard or "reference" QM which will compress a representative ensemble of test images to a preselected average value, for example 20,000 bytes. If the packet size for the image after compression with the reference QM ($Pkt_r$) is between a first value and a second value, then the reference QM is used to compress the final image—i.e. a target packet size $Pkt_t$ equals $Pkt_r$. In one exemplary system, the first value is 15,000 bytes and the second value is 32,000 bytes. Hence, if $Pkt_r$ is less than 15,000 bytes, then one chooses a target packet size which will increase the image quality—i.e. $Pkt_t$ greater than $Pkt_r$. On the other hand, if the reference packet size is greater than 32,000 bytes, then one chooses a target packet size which will decrease the packet size—i.e. $Pkt_t$ less than $Pkt_r$. The target packet size is further constrained such that it will never exceed a predetermined maximum amount, such as 40,000 bytes. A plot of a typical target packet size transfer function is set forth in FIG. 9.

The typical transfer function of FIG. 9 from which one derives a target packet size from a reference packet size reveals that between a first value MINR and a second value MAXR for a reference packet size, the slope of the transfer function in portion 901 is unity thereby yielding target packet size equal to reference packet size in area 906. For reference packet sizes less than MINR the target packet size is greater than the reference packet size in area 905 along portion 902 of the transfer function. For reference packet sizes greater than MAXR, the target packet size will be less the reference packet size in area 907 due to the characteristics of transfer curve portion 903. Finally, as seen from FIG. 9, a maximum value MAXT for the target packet size is selected such that the transfer characteristic portion 904 will remain constant at MAXT in area 908 for all reference packet sizes greater than the maximum value determined by portion 903 of the transfer characteristic.

As noted before, selection processor 215 stores a set of quantization matrices from which it may choose a final $QM_i$ to compress the document image. In this example, assume that i can have a value from 1 to 16—i.e. there are 16 matrices from which to choose. In order to decide which $QM_i$ to use, selection processor 215 must estimate what the image packet size $Pkt_i$ would be if the image were compressed with a given $QM_i$. There are two methods to estimate the final packet size $Pkt_i$, given $Pkt_r$. The first method estimates the final packet size directly, and the second estimates the final packet size indirectly by first normalizing to bits per pixel using the length and height information for the document images being processed.

The direct estimate $EstP_i$ is calculated by:

1.) $EstP_i = Mp_i * Pkt_r + Bp_i$

Where $Mp_i$ and $Bp_i$ have previously been determined to be optimal by actually compressing a test ensemble of images using the reference QM and $QM_i$.

The indirect estimate $EstB_i$ is calculated by first calculating the image bits per pixel using the reference quantization matrix:

2.) $BPP_r = (8 * Pkt_r)/(Len * Hgt)$

And then estimating $EstB_i$ by:

3.) $EstB_i = (Len * Hgt * \frac{1}{8}) * (Mb_i * BPP_r + Bb_i)$

As before, $Mb_i$ and $Bb_i$ will have been previously determined in the laboratory using a test ensemble of documents.

Selection processor 215 can use either of the two estimators, $EstP_i$ and $EstB_i$, to compute the final packet size $Pkt_i$. In general, a weighted average of these two estimates is used to compute $Pkt_i$, as follows:

4.) $Pkt_i = W * EstP_i + (1-W) * EstB_i$

W is a weight for the $EstP_i$ packet size estimator, is a real number and will generally be larger than $(1-W)$, if one has more confidence in $EstP_i$ as an estimator than $EstB_i$. W may be a constant, or may depend upon the height, length and reference packet size data and the index i. The remaining variables in the above formulas are defined as follows:

Len=The length of the imaged document in pixels.

Hgt=The height of the imaged document in pixels.

$Pkt_r$=Document image packet size in bytes after compressing with the reference QM. One side (front or back) only.

$BPP_r$=The compressed image bits per pixel after compressing with the reference QM.

$BPP_r = (8 * Pkt_r)/(Len * Hgt)$ $Pkt_t$=Target document image packet size in bytes.

$EstP_i$=Directly estimated document image packet size if the ith QM were used to compress the image.

$EstB_i$=Indirectly estimated document image packet size if the ith QM were used to compress the image. Note that $EstB_i$ and $EstP_i$ are computed differently and are not necessarily directly related.

$Pkt_i$=Final estimated packet size. This number may be just the same as $EstP_i$ or $EstB_i$ or may be a weighted average of these two estimates.

$Mp_i$.

$Bp_i$=The slope and Y-intercept of the estimation function used to estimate final packet size of an image.

$EstP_i = (Mp_i * Pkt_r) + Bp_i$ $Mb_i$.

$Bb_i$=The slope and Y-intercept of the estimation function used to estimate the final bits per pixel of an image.

$EstB_i = (Hgt * Len * \frac{1}{8}) * (Mb_i * BPP_r + Bb_i)$

Given $Pkt_t$, selection processor 215 will choose the quantization matrix which it believes will compress the image to an estimated packet size $Pkt_i$ closest to, but not exceeding, the target packet size $Pkt_t$. If no estimated packet size is less than or equal to the target packet size, then selection processor 215 chooses the quantization matrix which yields the smallest packet size estimate.

A digital signal processor in selection processor 215 is used to estimate $Pkt_i$ and choose the quantization matrix which comes closest to the target. This allows implementation of the entire method either as a series of steps as described above or in a single step using a look up table which has been generated using the reference packet size, heighth and length information of the documents to be processed. A flow chart setting forth the above described steps in selecting i for $QM_i$ is set forth in FIG. 8.

Next, processor 215 associates each prestored quantization matrix with an optimal Huffman code table set designed specifically for that quantization matrix. The quantization matrix selected along with its associated Huffman code table is passed via bus 267 to the compressor unit 219 of FIG. 2 for compression of the image data.

In this way, processor 215 enables the image compressor 219 to control both the lower and upper bounds on the compressed document image packet size and additionally enables compressor 219 to control the variance in the statistical distribution associated with the compressed packet size data for a collection of document images.

The specifics of the quantization matrix selection process is not germane to the principles of the invention. Rather, the invention contemplates the provision of a plurality of quantization matrices such that the system may, on a document-by-document basis, "tune" the compression characteristics of the JPEG compression algorithm. In general, however, the characteristics of the modifying terms present in the quantization matrix determine the compression characteristics. Since, as mentioned hereinabove, the elements of the quantization matrix are applied to modify each of the discrete cosine transform coefficients, then it is clear that by properly constructing a quantization matrix, more or less of the DCT coefficients may be, in effect, ignored or discarded for a specific document imagery in accordance with the size of the modifiers. The larger the modifier, the higher the probability that its corresponding DCT coefficient will be rounded to zero—i.e. discarded. The more coefficient terms which are discarded, the more compressible the corresponding pixel element data field.

Ideally, a system would be provided with a very large number of quantization matrices such that each image could be compressed to exactly the same number of information bits. Since, of course, practicalities dictate less than an infinite number of prestored quantization matrices, one must empirically determine a suitable number for the plurality of prestored matrices to be utilized. In one system exhibiting acceptable performance, sixteen matrices are generated for both front and rear document images using a test set of typical documents and prestored with the apparatus set forth in FIG. 2.

The invention has been described with reference to the details of a preferred embodiment which have been set forth for the sake of example only. The scope and spirit of the invention are to be determined from appropriate interpretation of the appended claims.

APPENDIX 1

```
/*    Main       */
read_hist_file (hist_file, hist, ingrays);              /*Read histogram data */
get_CRP (hist, ingrays, CRP);                           /*Compute CR protected range */
get_control_points (hist, ingrays, bcp, wcp);           /*Get stretch control points */
make_comb_LUT (comblut, ingrays, outgrays, bcp, wcp, CRP);
```

APPENDIX 2

```
/*    get_control_points    */
#define BLK_INT_THRESH 1000
#define WHT_INT_THRESH 1000
get_control_points (hist, ingrays, bcp, wcp);
sum = 0
i = 0
while (hist[i]==0)                                      /* Skip to the first non-zero */
    i++;                                                /* histogram entry            */
i++;                                                    /* Skip this entry because it */
                                                        /* contains the overscan      */
while (sum < BLK_INT_THRESH) {                          /* Integrate histogram until  */
    sum = sum + hist[i];                                /* frequency threshold is reached.*/
    i++;
}
bcp = i;                                                /* This is black control point */
sum = 0
i = ingrays–1;
while (sum < WHT_INT_THRESH) {                          /* Integrate histogram unit   */
    sum = sum + hist[i];                                /* frequency threshold is reached.*/
    i--;
}
wcp = i;                                                /* This is white control point */
return;
```

APPENDIX 3

```
/* make_comb_LUT */
make_comb_LUT (comblut, ingrays, outgrays, bcp, wcp, CRP);
bcpcr = cr(bcp, CRP);
for (i=0; i< = bcp; i++)
    comblut[i]= 0
for (i=bcp+1; i< = wcp; i++)              /* Equation 4 */
    comblut[i] = (int)((outgrays–1)*(double)(cr(i,CRP)–bcpcr)/(wcp–bcpcr)+0.5);
for (i=wcp+1; j<ingrays; i++)
    comblut[i] = outgrays–1;
return;
        /*   cr   */
#define COMPRESS 2.0
cr(i,CRP);
if (i < CRP)                              /* Equation 1a     */
    return((int)((1/COMPRESS)*i+(COMPRESS–1)*CRP/COMPRESS+0.5));
else
    return(i);                            /* Equation 1b     */
```

What is claimed is:

1. Apparatus for pre-processing document image data prior to data compression, said data being arranged as a plurality of pixels, each representing one of a plurality of gray levels, the apparatus comprising:

a means for generating document image data comprising highly visible pixel data and nominally visible background pixel data, histogram generation means for generating a histogram having a highly visible pixel data portion and a nominally visible background pixel data portion, histogram processing means for generating a contrast reduction pixel conversion on said highly visible gray level pixel data, said histogram processing means further performing a stretch pixel conversion function of the converted highly visible gray level pixel data and the nominally visible gray level pixel data in accordance with preselected characteristics of said histogram generating a contrast increase pixel conversion of said pixel data; and means for combing the contrast reduction and the gray level stretch conversion functions and for applying a combined conversion function to the document image data prior to data compression to minimize loss of said nominally visible background pixel data.

2. The apparatus of claim 1, wherein the contrast reduction pixel conversion function comprises a piecewise linear function wherein a converted output pixel gray level value is related to a corresponding input pixel gray level value by a linear function having a slope less than unity for the highly visible input pixel gray level values less than a predetermined contrast reduction protection value selected as a function of characteristics of the histogram, and wherein a converted output pixel gray level value is equal to a corresponding input pixel gray level value for input pixel gray level values equal to or greater than the contrast reduction protection value.

3. The apparatus of claim 2, wherein the contrast reduction protection value is a predetermined percentage of a gray level value corresponding to a preselected peak value of the histogram.

4. The apparatus of claim 1, wherein the gray level stretch conversion function comprises a piece-wise linear function wherein a converted output pixel gray level value is a blackest value for all input pixel gray level values less than or equal to a predetermined black clip value selected as a function of characteristics of the histogram, a converted output pixel gray level value is related to a corresponding input pixel gray level value by a linear function having a slope greater than unity for input pixel gray level values greater than the black clip value and less than a predetermined white clip value selected as a function of characteristics of the histogram, and a converted output pixel gray level value is a whitest value for all input pixel gray level values greater than or equal to the white clip value.

5. The apparatus of claim 4, wherein the black clip value is determined by comparing a cumulative sum of histogram frequencies to a first preselected threshold value and a white clip value is determined by comparing a cumulative sum of histogram frequencies to a second preselected threshold value.

6. The apparatus of claim 1, wherein the gray level stretch conversion function comprises a piece-wise linear function wherein a converted output pixel gray level value is a blackest value for all input pixel gray level values less than or equal to a predetermined black clip value selected as a function of characteristics of the histogram, a converted output pixel gray level value is related to a corresponding input pixel gray level value by a linear function having a slope greater than unity for input pixel gray level values greater than the black clip value and less than a predetermined white clip value selected as a function of characteristics of the histogram, and a converted output pixel gray level value is a whitest value for all input pixel gray level values greater than or equal to the white clip value.

7. The apparatus of claim 1, wherein the contrast reduction pixel conversion function and the gray level stretch conversion functions are combined and implemented as a look-up table.

8. A method for pre-processing document image data arranged as a plurality of pixels, each representing one of a plurality of gray levels, the method comprising the steps of:

(i) generating a histogram of all pixels in the document image data;

(ii) generating a contrast reduction pixel conversion function of highly visible gray level values of said histogram;

(iii) generating a gray level stretch conversion function of gray level values of said histogram to effect an increase contrast pixel conversion function in accordance with preselected characteristics of said histogram;

(iiii) combining the contrast reduction and gray level stretch conversion functions and (iiiii) applying a combined conversion function to the document image data prior to data compression.

9. The method of claim 8, wherein the contrast reduction pixel conversion function comprises a piecewise linear function wherein a converted output pixel gray level value is related to a corresponding input pixel gray level value by a linear function having a slope less than unity for input pixel gray level values less than a predetermined contrast reduction protection value selected as a function of characteristics of the histogram, and wherein a converted output pixel gray level value is equal to a corresponding input pixel gray level value for input pixel gray level values equal to or greater than the contrast reduction protection value.

10. The method of claim 9, wherein the gray level stretch conversion function comprises a piece-wise linear function wherein a converted output pixel gray level value is a blackest value for all input pixel gray level values less than or equal to a predetermined black clip value selected as a function of characteristics of the histogram, a converted output pixel gray level value is related to a corresponding input pixel gray level value by a linear function having a slope greater than unity for input pixel gray level values greater than the black clip value and less than a predetermined white clip value selected as a function of characteristics of the histogram, and a converted output pixel gray level value is a whitest value for all input pixel gray level values greater than or equal to the white clip value.

11. The method of claim 10, wherein the contrast reduction pixel conversion function and the gray level stretch conversion function are combined and implemented as a look-up table.

12. The improved method of claim 9, wherein the contrast reduction protection value is a predetermined percentage of a gray level value corresponding to a preselected peak value of the histogram.

13. The method of claim 12, wherein the slope of the linear function for pixel gray level values less than the contrast reduction protection value is empirically determined for a test set of documents of a class of documents to be compressed.

14. The method of claim 8, wherein the gray level stretch conversion function comprises a piece-wise linear function wherein a converted output pixel gray level value is a blackest value for all input pixel gray levels less than or equal to a predetermined black clip value selected as a function of characteristics of the histogram, a converted output pixel gray level value is related to a corresponding input pixel gray level value by a linear function having a slope greater than unity for input pixel gray level values greater than the black clip value and less than a predetermined white clip value selected as a function of characteristics of the histogram, and a converted output pixel gray level value is a whitest value for all input pixel gray level values greater than or equal to the white clip value.

15. The method of claim 14, wherein the black clip value is determined by comparing a cumulative sum of histogram frequencies to a first preselected threshold value and the white clip value is determined by comparing a cumulative sum of histogram frequencies to a second preselected threshold value.

* * * * *